(12) United States Patent
Carson

(10) Patent No.: US 11,390,388 B2
(45) Date of Patent: Jul. 19, 2022

(54) URINE-BASED POWER GENERATION FOR ADJUSTABLE SEAT CUSHION

(71) Applicant: AMI INDUSTRIES, INC., Colorado Springs, CO (US)

(72) Inventor: Kassidy L. Carson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 420 days.

(21) Appl. No.: 16/415,931

(22) Filed: May 17, 2019

(65) Prior Publication Data
US 2020/0361625 A1 Nov. 19, 2020

(51) Int. Cl.
| | | |
|---|---|---|
| B64D 25/10 | (2006.01) |
| B64D 41/00 | (2006.01) |
| A47K 11/12 | (2006.01) |
| B64D 11/06 | (2006.01) |
| H02J 7/34 | (2006.01) |

(52) U.S. Cl.
CPC ............. *B64D 25/10* (2013.01); *A47K 11/12* (2013.01); *B64D 11/0626* (2014.12); *B64D 11/0639* (2014.12); *B64D 41/00* (2013.01); *H02J 7/342* (2020.01)

(58) Field of Classification Search
CPC ................ B64D 25/10; B64D 11/0626; B64D 11/0639; B64D 41/00; A47K 11/12
See application file for complete search history.

(56) References Cited

U.S. PATENT DOCUMENTS

| | | | |
|---|---|---|---|
| 2,722,268 A | 11/1955 | Green et al. | |
| 3,311,330 A * | 3/1967 | Hofferberth | ........... B64D 25/10 244/141 |
| 3,353,539 A | 11/1967 | Preston | |
| 4,132,228 A | 1/1979 | Green | |
| 4,853,992 A | 8/1989 | Yu | |
| 4,904,248 A * | 2/1990 | Vaillancourt | ........... A61F 5/455 604/327 |

(Continued)

FOREIGN PATENT DOCUMENTS

CN 101234063 8/2008

OTHER PUBLICATIONS

University of Bath. (Apr. 18, 2016). Urine turned into sustainable power source for electronic devices. ScienceDaily. Retrieved Jul. 21, 2021 from www.sciencedaily.com/releases/2016/04/160418095918.htm (Year: 2016).*

(Continued)

*Primary Examiner* — Richard R. Green
*Assistant Examiner* — Ashesh Dangol
(74) *Attorney, Agent, or Firm* — Snell & Wilmer L.L.P.

(57) ABSTRACT

A seat configured to support an occupant may include a urine-based power generator and an adjustable cushion. The urine-based power generator includes a urine accumulation reservoir configured to receive urine from the occupant, and the urine-based power generator is configured to provide power to the adjustable cushion. The seat may be an ejection seat, and the urine-based power generator and the adjustable cushion may be mounted to the seat such that the urine-based power generator and the adjustable cushion are configured to be ejected with the ejection seat.

17 Claims, 5 Drawing Sheets

(56) References Cited

U.S. PATENT DOCUMENTS

| | | | |
|---|---|---|---|
| 5,117,638 A | | 6/1992 | Feher |
| 5,282,286 A | | 2/1994 | MacLeish |
| 5,626,386 A | | 5/1997 | Lush |
| 6,085,369 A | | 7/2000 | Feher |
| 6,263,530 B1 | | 7/2001 | Feher |
| 7,610,100 B2 | | 10/2009 | Jaax et al. |
| 8,181,292 B1 | | 5/2012 | Pellettiere |
| 9,642,469 B2 | * | 5/2017 | Savicki ............... A47C 27/082 |
| 9,730,518 B1 | | 8/2017 | Jacobs |
| 2003/0219371 A1 | | 11/2003 | Amendola |
| 2009/0308672 A1 | * | 12/2009 | Soldatos ............... A61G 5/047 |
| | | | 180/65.1 |
| 2010/0148552 A1 | | 6/2010 | Bredl |
| 2015/0162628 A1 | | 6/2015 | Vandroux et al. |
| 2017/0348188 A1 | * | 12/2017 | Inada ................... A61H 9/0078 |
| 2019/0135145 A1 | * | 5/2019 | Zhang .................. B60N 2/5678 |

OTHER PUBLICATIONS

Jon Chouler, George A. Padgett, Petra J. Cameron, Kathrin Preuss, Maria-Magdalena Titirici, Ioannis Ieropoulos, Mirella Di Lorenzo. Towards effective small scale microbial fuel cells for energy generation from urine. Electrochimica Acta, 2016; 192: 89 DOI: 10.1016/j.electacta.2016.01.112.

University of Bath. "Urine turned into sustainable power source for electronic devices.", ScienceDaily. ScienceDaily, Apr. 18, 2016., <www.sciencedaily.com/releases/2016/04/160418095918.htm>.

* cited by examiner

URINE-BASED POWER GENERATION FOR ADJUSTABLE SEAT CUSHION

FIELD

The present disclosure relates to vehicle seats, and more specifically to urine-based power generation for adjustable seat cushions.

BACKGROUND

Pilots and/or occupants of aircraft and other vehicles occasionally participate in long-duration missions. For example, pilots may be seated for many hours while flying an aircraft during an endurance mission. Because such occupants may remain in a seated position for prolonged and uninterrupted periods of time, seat comfort may be an important factor. While certain seats are adjustable in order to provide customized comfort to the occupant, such seats often are electrically connected to main power systems of the vehicle. However, in certain situations the seat may be ejectable in response to emergencies, and thus power connections between the aircraft and ejection seats may be impractical. In addition to seat comfort, a system that enables pilots to urinate during flight may be necessary. While certain conventional solutions include a bag or other pouch strapped to the pilot to hold discharged urine, such systems have various shortcomings and often have an associated stigma.

SUMMARY

In various embodiments, the present disclosure provides a seat configured to support an occupant. A urine-based power generator may be coupled to the seat, and the seat may also include an adjustable cushion. The urine-based power generator may include a urine accumulation reservoir configured to receive urine from the occupant, and the urine-based power generator may be configured to provide power to the adjustable cushion.

In various embodiments, the seat is an ejection seat, wherein the urine-based power generator and the adjustable cushion are mounted to the seat such that the urine-based power generator and the adjustable cushion are configured to be ejected with the ejection seat. The ejection seat may include a seat base, and the urine-based power generator may be housed within the seat base below the adjustable cushion. In various embodiments, at least one property of the adjustable cushion is configured to be selectively modulated. For example, the at least one property comprises at least one of a temperature, a shape, a position, an orientation, and vibratory motion of the adjustable cushion, according to various embodiments.

In various embodiments, the urine-based power generator is configured to generate electric energy. The seat may further include a fluid-flow device coupled to the seat in electric power receiving communication with the urine-based power generator. The fluid-flow device may be configured to modulate at least one of a temperature, a shape, a position, an orientation, and vibratory motion of the adjustable cushion. The adjustable cushion may further include at least one of an anti-fatigue reservoir, a fluid-cooling reservoir, and fluid-heating reservoir in selectable fluid receiving communication with the fluid-flow device. The adjustable cushion may comprise an anti-fatigue reservoir in selectable fluid received communication with the fluid-flow device, an electric cooling device in electric power receiving communication with the urine-based power generator, and an electric heating device in electric power receiving communication with the urine-based power generator.

In various embodiments, the adjustable cushion comprises at least one of a vibratory anti-fatigue device, an electric cooling device, and an electric heating device in electric power receiving communication with the urine-based power generator. In various embodiments, the seat further includes an electric energy storage device coupled to the seat, wherein the urine-based power generator is configured to at least one of charge and recharge the electric energy storage device. The seat may further include a waste reservoir in fluid receiving communication with the urine-based power generator. Further, the seat may include a quick connect manifold coupled between the urine-based power generator and a urine collection device configured to be worn by the occupant.

Also disclosed herein, according to various embodiments, is a vehicle comprising a seat configured to support an occupant, a urine-based power generator coupled to the seat, and an adjustable cushion coupled to the seat. The urine-based power generator comprises a urine accumulation reservoir configured to receive urine from the occupant, according to various embodiments. The urine-based power generator is configured to generate electric energy, and the urine-based power generator is configured to provide power to the adjustable cushion such that at least one property of the adjustable cushion is configured to be selectively modulated, according to various embodiments.

In various embodiments, the at least one property comprises at least one of a temperature, a shape, a position, an orientation, and vibratory motion of the adjustable cushion. The vehicle may further include a fluid-flow device coupled to the seat in electric power receiving communication with the urine-based power generator, wherein the fluid-flow device is configured to modulate at least one of a temperature, a shape, a position, an orientation, and vibratory motion of the adjustable cushion. In various embodiments, the adjustable cushion comprises at least one of an anti-fatigue reservoir, a fluid-cooling reservoir, and a fluid-heating reservoir in selectable fluid receiving communication with the fluid-flow device. In various embodiments, the adjustable cushion comprises an anti-fatigue reservoir in selectable fluid received communication with the fluid-flow device, an electric cooling device in electric power receiving communication with the urine-based power generator, and an electric heating device in electric power receiving communication with the urine-based power generator. In various embodiments, the adjustable cushion comprises at least one of a vibratory anti-fatigue device, an electric cooling device, and an electric heating device in electric power receiving communication with the urine-based power generator.

Also disclosed herein, according to various embodiments, is a method of modulating an adjustable cushion of a seat. The method may include receiving urine from an occupant seated in the seat, generating electric power from the urine, and modulating at least one of a temperature, a shape, a position, an orientation, and vibratory motion of the adjustable cushion.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
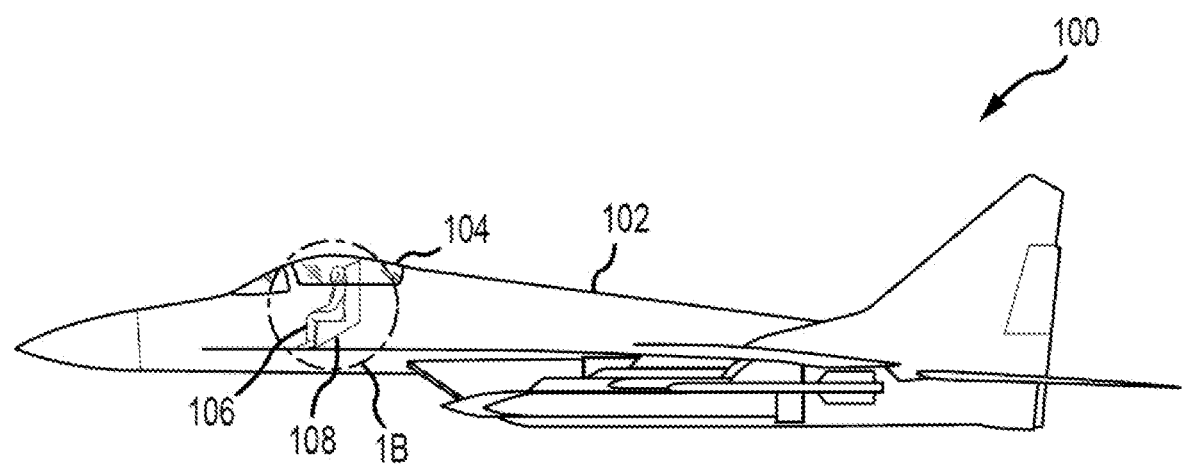
FIG. 1A is a simplified side view of an aircraft having a seat and an occupant, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Referring now to FIG. 1A, an aircraft 100 is illustrated. In various embodiments, the aircraft 100 includes a fuselage 102 and a canopy 104 enclosing an internal cockpit in which an occupant 106 (e.g., a pilot) is positioned while operating the aircraft 100. An ejection seat 108 is disposed within the cockpit and configured to accommodate the occupant 106 during operation of the aircraft 100 as well as during an ejection sequence occurring in the event of a malfunction of the aircraft 100.

Figure 1B:
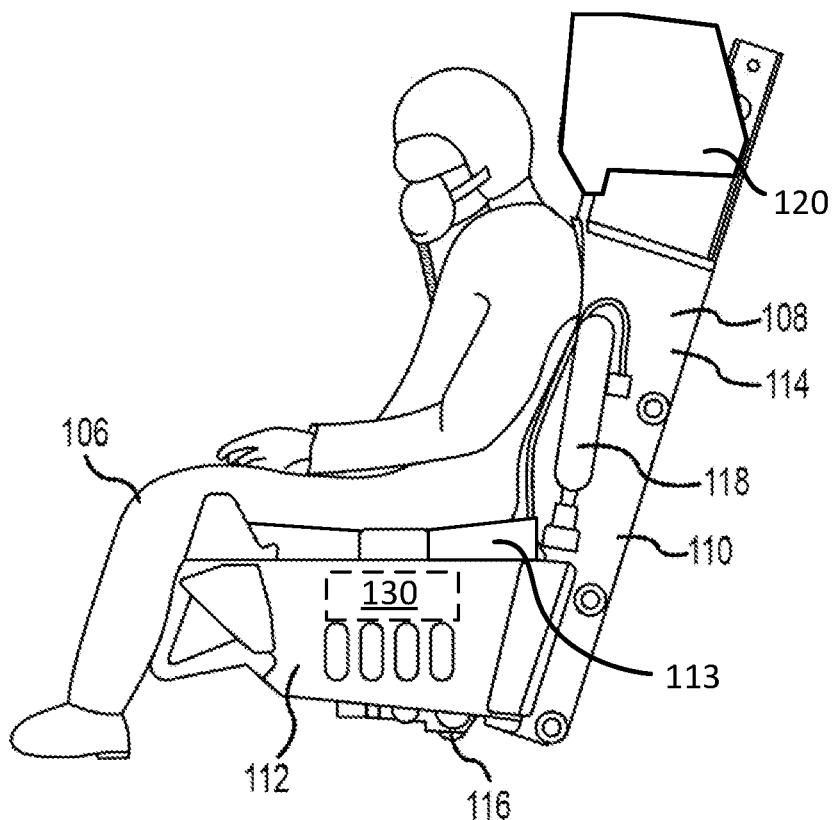
FIG. 1B is a side view of a seat having a urine-based power generator, in accordance with various embodiments.

Referring now to FIG. 1B, the ejection seat 108 is illustrated with the occupant 106 positioned thereon. In various embodiments, the ejection seat 108 includes a seat frame 110 comprising a seat base 112 and a seat back 114 adapted to support the occupant 106. The ejection seat 108 is equipped with a propulsion subsystem typically comprising a catapult and a rocket motor 116 for propelling the seat frame 110 free of the aircraft 100 in response to an eject signal. In various embodiments, the ejection seat 108 is further equipped with a remote oxygen supply 118 and may include other features typically associated with ejection mechanisms. In various embodiments, the ejection seat 108 further includes a headrest 120. The headrest 120 may support the head of the occupant 106.

In various embodiments, and with continued reference to FIG. 1B, a urine-based power generator 130 is coupled to the ejection seat 108. The urine-based power generator 130 may comprise a urine accumulation reservoir configured to receive urine from the occupant 106. The ejection seat 108 may also include an adjustable cushion 113. Generally, the urine-based power generator 130 is configured to provide power to the adjustable cushion 113, thereby enabling the adjustable cushion 113 to be selectively modulated to improve comfort of the occupant 106. While numerous details are included herein pertaining to urine-based power generation in conjunction with ejection seats of aircraft, the present disclosure may apply to other seats in other types of vehicles. For example, the urine-based power generator 130 may utilized in seats of space vehicles, ships, submersible vehicles, ground transportation vehicles, etc.

In various embodiments, the urine-based power generator 130 and the adjustable cushion 113 are mounted to the seat 108 such that the urine-based power generator 130 and the adjustable cushion 113 are ejected with the ejection seat 108. Said differently, the urine-based power generator 130 and the adjustable cushion 113 may be integrated into the seat, and thus may be substantially independent of other systems of the aircraft. For example, the adjustable cushion 113 may be coupled to (or may be a portion of) the seat base 112, and the urine-based power generator 130 may be housed within the seat base 112 below the adjustable cushion 113. In various embodiments, the adjustable cushion 113 may be selectively modulated via a user interface accessible to the occupant 106. As described in greater detail below, the seat 108 may include a controller 205 (FIG. 2) configured to control actuation/modulation of the urine-based power generator 130 and/or the adjustable cushion 113. In various embodiments, the temperature, the shape, the position, the orientation, the firmness, and/or the vibratory motion (e.g., vibration response), among other parameters, of the adjustable cushion may be selectively controlled.

Figure 2:
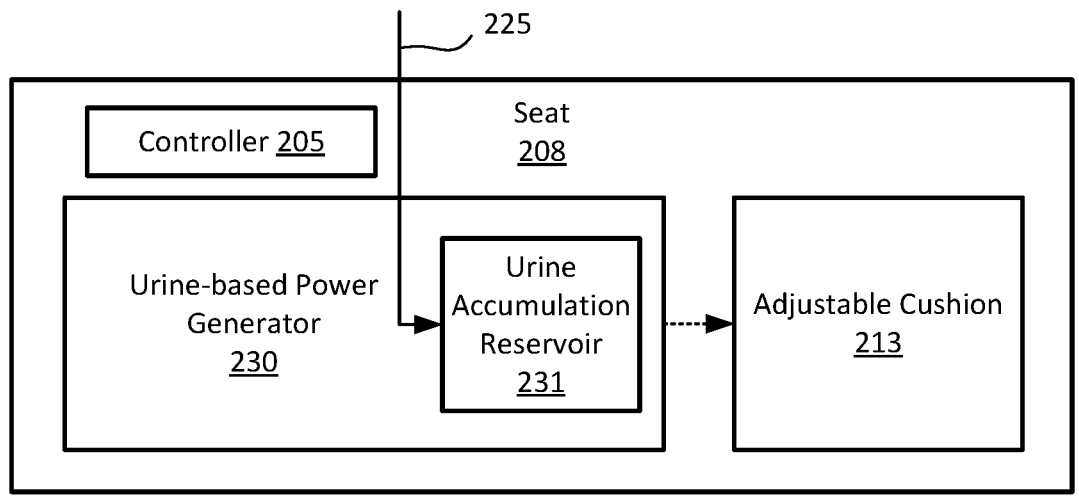
FIG. 2 is a schematic block diagram of a seat of a vehicle with integrated, urine-based power generation and an adjustable cushion, in accordance with various embodiments.

In various embodiments, and with reference FIG. 2 a schematic block diagram of a seat 208 of a vehicle is provided. The seat 208 includes the urine-based power generator 230, the adjustable cushion 213, and a controller 205, according to various embodiments. The controller 205 may be integrated into computer systems onboard the vehicle/aircraft. The controller 205 may also be a standalone computer system separate from the vehicle/aircraft and in electronic communication with the vehicle/aircraft, as described in further detail herein. The controller 205 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the controller 205 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The controller 205 may be configured to communicate with and control the various components of the seat 208. For example, the controller 205 may be configured to control the urine-based power generator 230 and the adjustable cushion 213. In various embodiments, the controller 205 is also coupled in electronic communication with other mechanisms, valves, features, and interfaces to effectuate control of the system. In various embodiments, the seat 208 includes a urine collection line 225 extending from the occupant to the urine-based power generator 230 (i.e., to a urine accumulation reservoir 231 of the urine-based power generator 230). In various embodiments, and with momentary reference to FIG. 6, the urine collection line 225 includes a quick connect manifold 629 coupled between the urine-based power generator 230 (i.e., the urine accumulation reservoir 231) and a urine collection device 628 configured to be worn and/or strapped to the occupant.

The urine-based power generator 230, according to various embodiments, is configured to generate electric energy. Accordingly, the urine-based power generator 230 may be a device that utilizes body fluids, such as urine, to generate electricity. Said differently, the urine-based power generator 230 may utilize urine from the occupant as the electrolyte in a fuel cell. Generally, the urea content in urine may decompose into ammonia, and the ammonia may be oxidized to produce electrons.

The electricity generated by the urine-based power generator 230 may be utilized by the adjustable cushion 213 to actuate one or more devices, mechanisms, reservoirs, etc., to modulate the properties of the adjustable cushion 213, thereby improving the comfort of the occupant. In various embodiments, and with momentary reference to FIG. 6, an electric energy storage device 660 may be coupled to the seat 608. The electric energy storage device 660 may be a battery, a capacitor, or other device/mechanism for storing electric energy. The urine-based power generator 230 may be configured to transfer electricity directly to the adjustable cushion 213 to modulate the parameters of the adjustable cushion, and/or the urine-based power generator 230 may be configured to transfer electricity to the electric energy storage device 660, which provides electric power to the adjustable cushion 213. Said differently, the urine-based power generator 230 may be configured to charge the electric energy storage device 660 or recharge the electric energy storage device 660 during the flight. As used throughout FIGS. 2-6, solid connector lines (e.g., urine collection line 225) indicates urine transfer between components, dotted lines indicate electronic power communication between components, and dashed lines indicate fluid transfer between components (e.g., airflow, see FIGS. 4 and 5).

Figure 3:
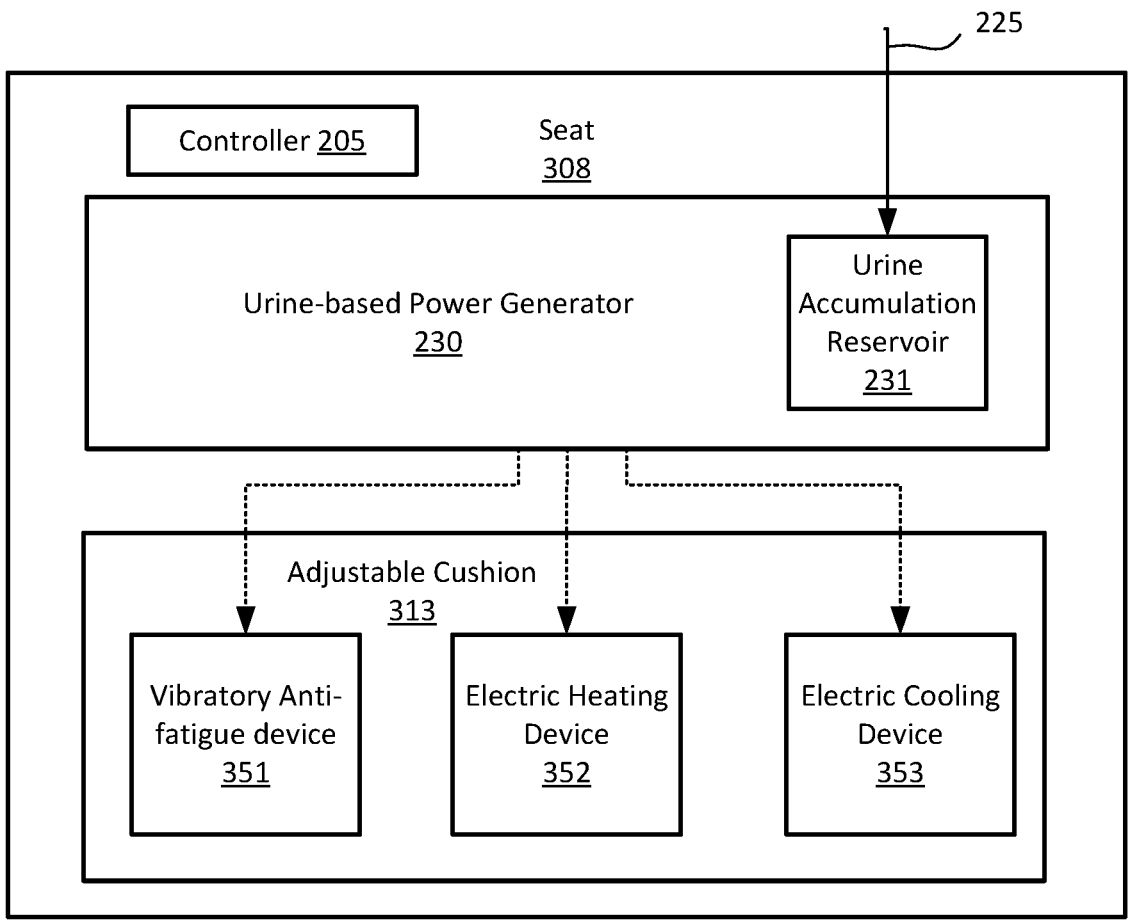
FIG. 3 is a schematic block diagram of a seat of a vehicle with integrated, urine-based power generation and an adjustable cushion having one or more devices for modulating the properties of the adjustable cushion, in accordance with various embodiments.
Figure 6:
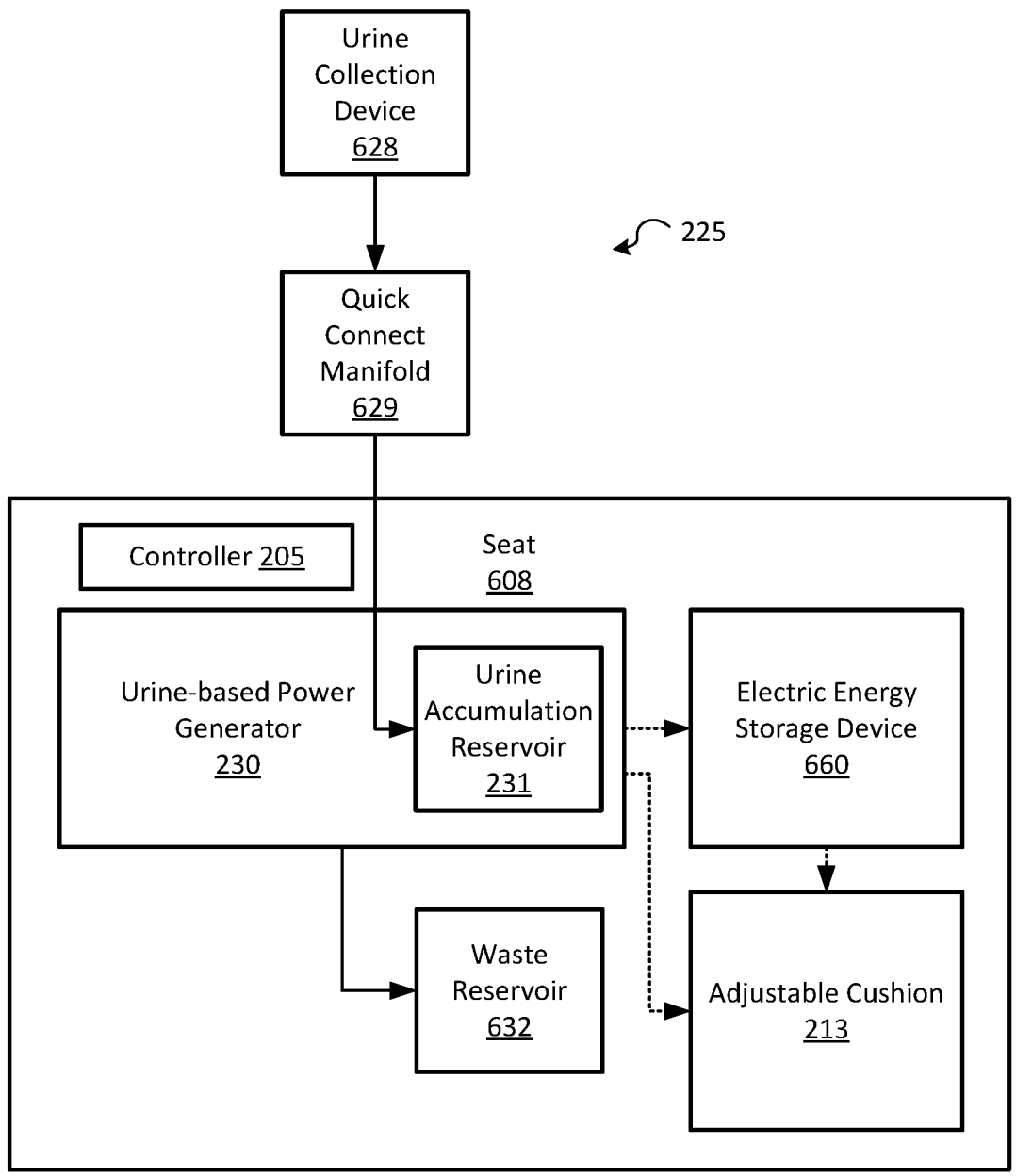
FIG. 6 is a schematic block diagram of a seat of a vehicle with a urine collection device, a quick connect manifold, an electric energy storage device, and a waste reservoir, in accordance with various embodiments.

In various embodiments, and with reference to FIG. 3, the adjustable cushion 313 of the seat 308 includes one or more devices for changing its own properties. That is, the adjustable cushion 313 may include one or more actuatable features that alter the temperature, shape, position, orientation, and/or firmness, among other parameters, of the adjustable cushion itself 313. For example, the adjustable cushion 313 may include a vibratory anti-fatigue device 351 that is configured to selectively vibrate to stimulate the legs and body of the occupant to improve blood circulation during long-duration missions and/or to otherwise improve the comfort of the occupant. In various embodiments, the adjustable cushion 313 includes one or more temperature devices, such as an electric heating device 352 and an electric cooling device 353, that control the temperature of the cushion to improve the comfort/health of the occupant. These devices 351, 352, 353 may be in electric power receiving communication with the urine-based power generator 230 (either directly, or indirectly via the electric energy storage device 660; FIG. 6).

Figure 4:
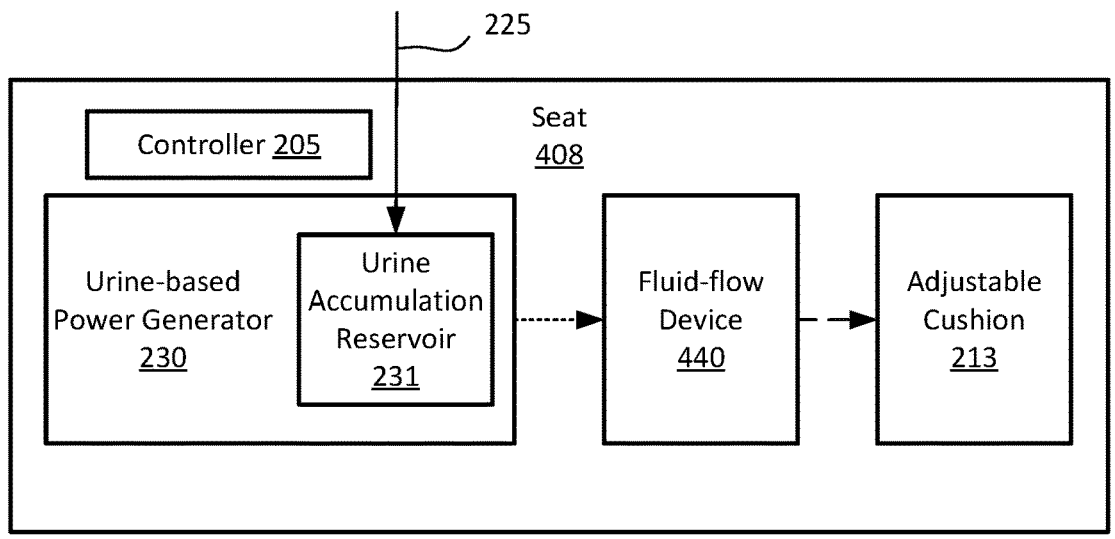
FIG. 4 is a schematic block diagram of a seat of a vehicle with integrated, urine-based power generation, a fluid-flow device, and an adjustable cushion, in accordance with various embodiments.

In various embodiments, and with reference to FIG. 4, the seat 408 further includes one or more fluid-flow devices 440. Said differently, the urine-based power generator 230 may provide power (e.g., electrical power) to one or more manifolds, pumps, and/or valves (collectively the "fluid-flow device" 440) to control a flow of fluid, such as air, to the adjustable cushion 213. Thus, the fluid-flow device 440 may be in electric power receiving communication with the urine-based power generator 230, and the adjustable cushion 213 may be fluidly actuated (e.g., pneumatically actuated) by the fluid-flow device 440. For example, and with reference to FIG. 5, the adjustable cushion 513 of the seat 508 may include one or more reservoirs 551, 552, 553 that, in response to the controlled flow of fluid from the fluid-flow device 440 to the reservoirs 551, 552, 553, alter the properties of the adjustable cushion 513 to improve comfort of the occupant. In various embodiments, the adjustable cushion 513 may include one or more anti-fatigue reservoirs 551. The fluid pressure within the anti-fatigue reservoir(s) 551 may be modulated to alter the shape, size, orientation, firmness, and general feel of the adjustable cushion 513. The fluid flow device 440 may further include heating and/or cooling elements configured to change the temperature of the one or more reservoirs 551, 552, 553 of the adjustable cushion 513, thereby allowing further customization/adjustability. In various embodiments, the heat/cooling elements are integrated directly into the reservoirs themselves, and thus the fluid (e.g., air) may be heated/cooled within the reservoirs of the cushion. These reservoirs 551, 552, 553 may be in selective/controllable fluid communication with the fluid-flow device 440.

Figure 5:
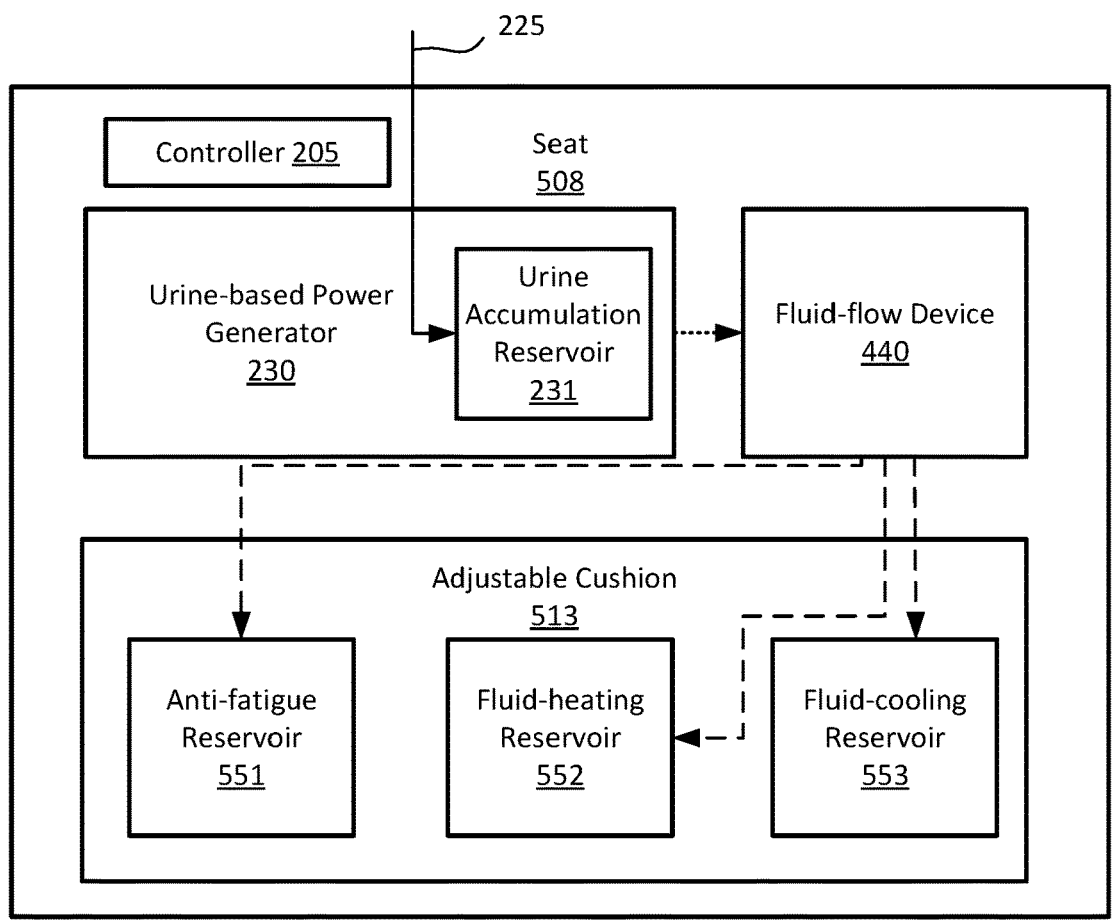
FIG. 5 is a schematic block diagram of a seat of a vehicle with integrated, urine-based power generation, a fluid-flow device, and an adjustable cushion having one or more reservoirs for modulating the properties of the adjustable cushion, in accordance with various embodiments.

In various embodiments, the seat may have a hybrid configuration between the seat 308 shown in FIG. 3 and the seat 508 shown in FIG. 5. That is, the adjustable cushion may incorporate and include electrically actuated devices 351, 352, 353 in electric power receiving communication with the urine-based power generator 230 and/or fluid actuated devices (e.g., reservoirs 551, 552, 553) in fluid receiving communication with a fluid-flow device 440. In various embodiments, and with reference to FIG. 6, the seat 608 may include a waste reservoir 632. The waste reservoir 632 may be in fluid receiving communication with the urine accumulation reservoir 231 of the urine-based power generator 230. The waste reservoir 632 may contain the byproducts of the chemical reaction configured to occur in the urine-based power generator 230.

Figure 7:
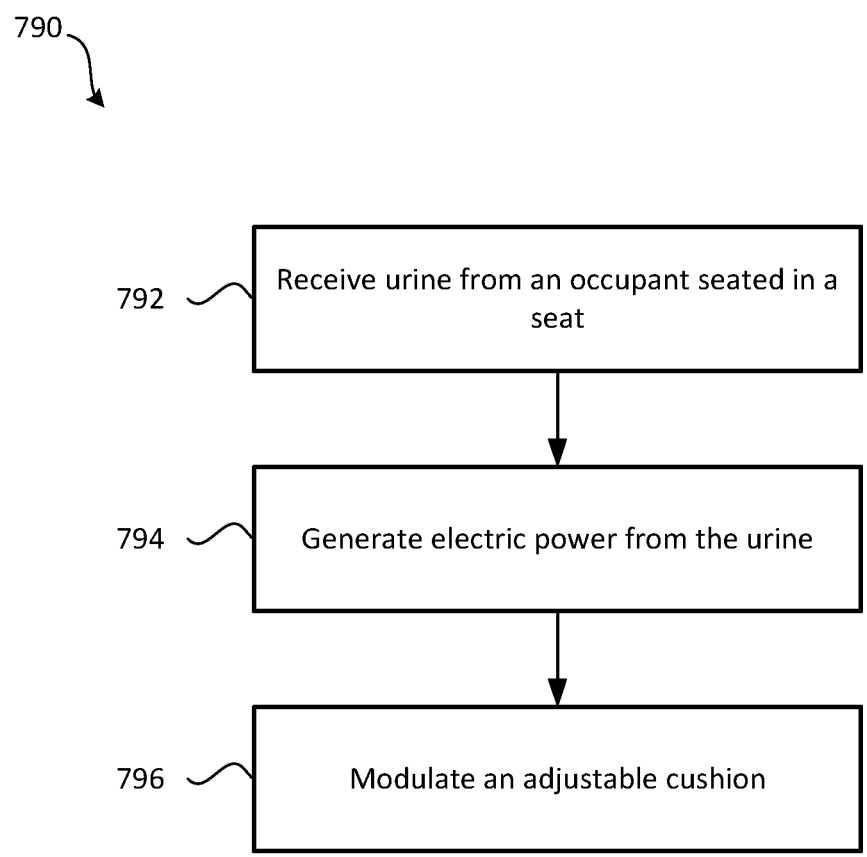
FIG. 7 is a schematic flow chart diagram of a method of modulating an adjustable cushion of a seat, in accordance with various embodiments.

In various embodiment, and with reference to FIG. 7, a schematic flow chart diagram of a method 790 of modulating an adjustable cushion of a seat is provided. The method 790 includes, according to various embodiments, receiving urine from an occupant seated in the seat at step 792, generating electric power form the urine at step 794, and modulating an adjustable cushion at step 796. Step 796 may include modulating at least one of a temperature, a shape, a position, an orientation, and vibratory motion of the adjustable cushion. In various embodiments, step 796 may be performed in response to a request/demand from the occupant (e.g., via a user interface). For example, the occupant may request a specific temperature, a specific shape/firmness, and/or specific vibratory motion. In various embodiments, step 796 may be automated based on a programmed scheme to improve the comfort, health, alertness, and/or acuity of the occupant. For example, step 796 may include performing various modulating steps to change the support provided to the body by the cushion. In various embodiments, the varying/changing support provided by the cushion is in response to flight conditions of the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ejection seat configured to support an occupant, the ejection seat comprising:
    a urine-based power generator mounted to the ejection seat, wherein the urine-based power generator comprises a urine accumulation reservoir configured to receive urine from the occupant, wherein the urine-based power generator is mounted to the ejection seat such that the urine-based power generator is ejected with the ejection seat;
    an electric energy storage device mounted to the ejection seat, wherein the urine-based power generator is configured to at least one of charge and recharge the electric energy storage device; and
    an adjustable cushion coupled to the ejection seat, wherein the electric energy storage device is configured to provide power to the adjustable cushion, and wherein all power provided to the adjustable cushion comes from the electric energy storage device and the urine-based power generator.

2. The ejection seat of claim 1, wherein the ejection seat comprises a seat base, wherein the urine-based power generator is housed within the seat base below the adjustable cushion.

3. The ejection seat of claim 1, further comprising a controller, wherein at least one property of the adjustable cushion is configured to be selectively modulated by the controller.

4. The ejection seat of claim 3, wherein the at least one property comprises at least one of a temperature, a shape, a position, an orientation, and vibratory motion of the adjustable cushion.

5. The ejection seat of claim 3, wherein the urine-based power generator is configured to generate electric energy.

6. The ejection seat of claim 5, further comprising a fluid-flow device coupled to the ejection seat and in electric power receiving communication with at least one of the urine-based power generator and the electric energy storage device, wherein the fluid-flow device is configured to modulate at least one of a temperature, a shape, a position, and an orientation of the adjustable cushion.

7. The ejection seat of claim 6, wherein the adjustable cushion comprises an anti-fatigue reservoir, a fluid-cooling reservoir, and a fluid-heating reservoir in selectable fluid receiving communication with the fluid-flow device.

8. The ejection seat of claim 6, wherein the adjustable cushion comprises an anti-fatigue reservoir in selectable fluid received communication with the fluid-flow device, an electric cooling device in electric power receiving communication with the at least one of the urine-based power generator and the electric energy storage device, and an electric heating device in electric power receiving communication with the at least one of the urine-based power generator and the electric energy storage device.

9. The ejection seat of claim 5, wherein the adjustable cushion comprises a vibratory anti-fatigue device, an electric cooling device, and an electric heating device in electric power receiving communication with at least one of the urine-based power generator and the electric energy storage device.

10. The ejection seat of claim 1, wherein the adjustable cushion is configured to receive power from both the urine-based power generator and the electric energy storage device.

11. The ejection seat of claim 1, further comprising a waste reservoir in fluid receiving communication with the urine-based power generator.

12. The ejection seat of claim 1, further comprising a quick connect manifold coupled between the urine-based power generator and a urine collection device configured to be worn by the occupant.

13. A vehicle comprising:
an ejection seat configured to support an occupant;
a urine-based power generator coupled to the ejection seat, wherein the urine-based power generator comprises a urine accumulation reservoir configured to receive urine from the occupant, wherein the urine-based power generator is configured to generate electric energy;
a waste reservoir in fluid receiving communication with the urine-based power generator and configured to receive a chemical reaction byproduct output from the urine-based power generator;
a fluid-flow device coupled to the ejection seat and in electric power receiving communication with the urine-based power generator;
an adjustable cushion coupled to the ejection seat, wherein the adjustable cushion comprises an anti-fatigue reservoir in selectable fluid receiving communication with the fluid-flow device, an electric cooling device in electric power receiving communication with the urine-based power generator, and an electric heating device in electric power receiving communication with the urine-based power generator; and
an electric energy storage device mounted to the ejection seat, wherein the urine-based power generator is configured to at least one of charge and recharge the electric energy storage device, and wherein all power provided to the adjustable cushion comes from the electric energy storage device and the urine-based power generator.

14. The vehicle of claim 13, wherein the fluid-flow device is configured to modulate at least one of a shape, a position, an orientation, and vibratory motion of the adjustable cushion.

15. The vehicle of claim 13, wherein the adjustable cushion further comprises at least one of a fluid-cooling reservoir and a fluid-heating reservoir in selectable fluid receiving communication with the fluid-flow device.

16. The vehicle of claim 13, wherein the adjustable cushion further comprises a vibratory anti-fatigue device; in electric power receiving communication with the urine-based power generator.

17. A method of modulating an adjustable cushion of an ejection seat, the method comprising:
receiving urine from an occupant seated in the ejection seat;
generating electric power from the urine via a chemical reaction;
outputting a byproduct of the chemical reaction into a waste receptacle located on the ejection seat;
charging an electric energy storage device mounted to the ejection seat using the electric power from the urine; and
modulating at least one of a temperature, a shape, a position, an orientation, and vibratory motion of the adjustable cushion using electric power provided from the electric energy storage device, wherein all power provided to the adjustable cushion comes from the electric energy storage device and the urine-based power generator.

* * * * *